Nov. 5, 1963
M. O. WILHOITE
3,109,421
RADIANT HEAT CONTROL SHIELD
Filed June 28, 1961
2 Sheets-Sheet 1
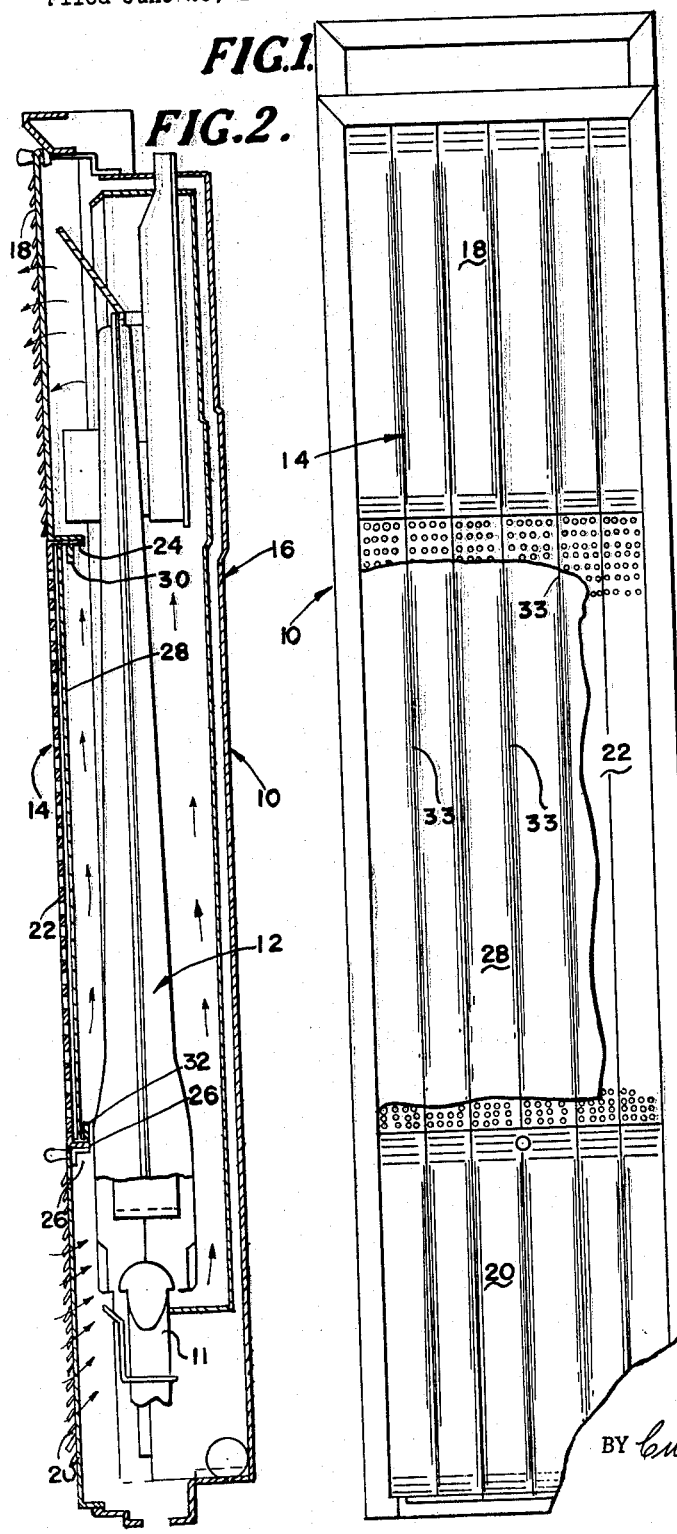
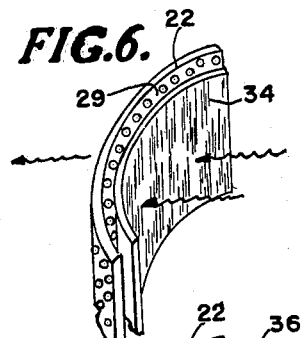
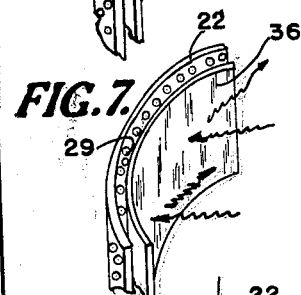
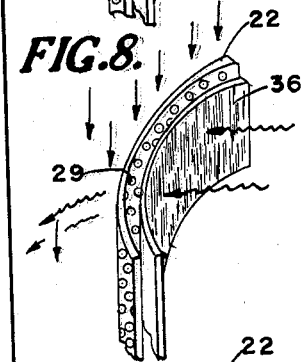
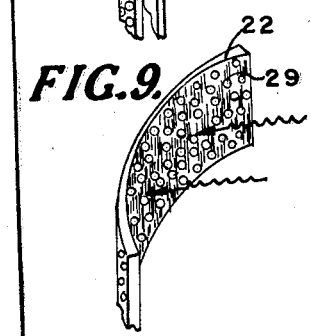
INVENTOR
MURRAY O. WILHOITE
BY Cushman, Darby & Cushman
ATTORNEYS

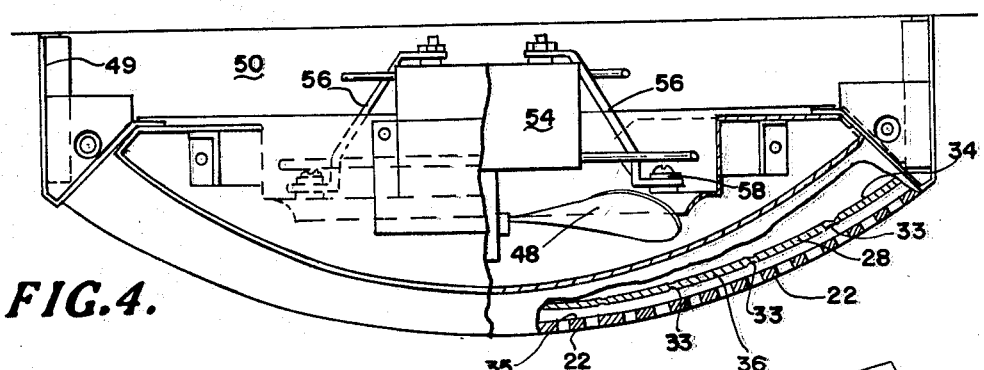
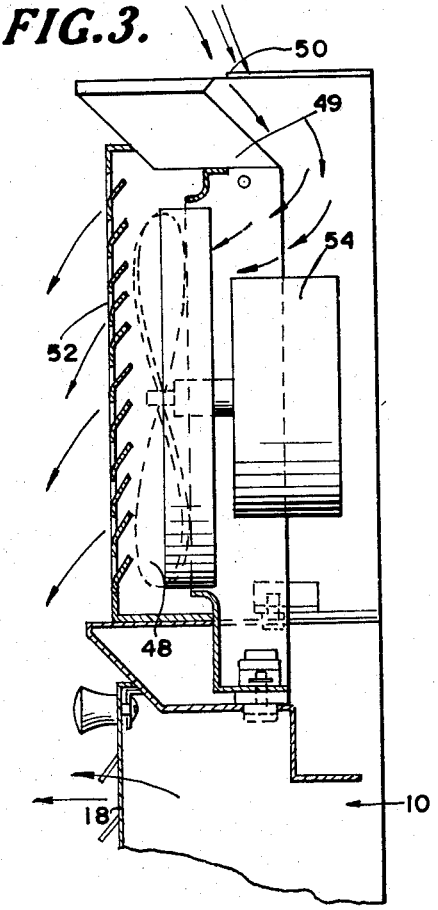
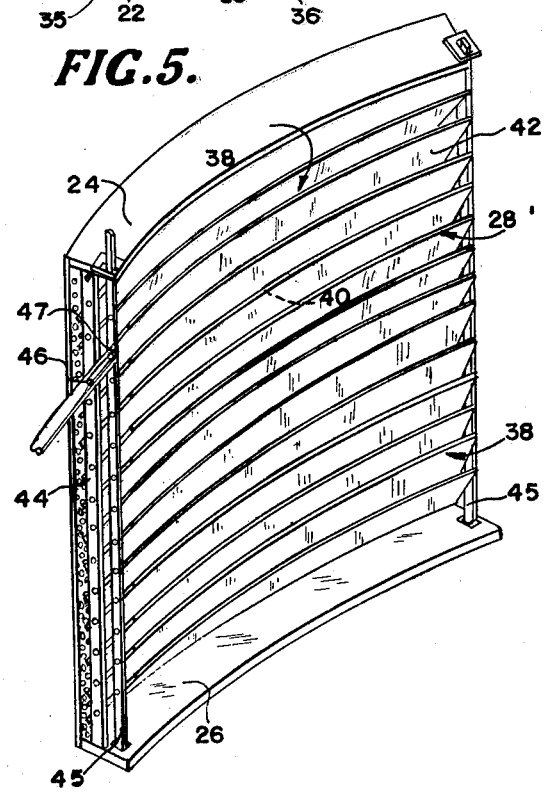

3,109,421
RADIANT HEAT CONTROL SHIELD
Murray O. Wilhoite, Nashville, Tenn., assignor to Temco, Inc., Nashville, Tenn., a corporation of Tennessee
Filed June 28, 1961, Ser. No. 120,386
7 Claims. (Cl. 126—90)

This invention relates to gas heaters and has particular reference to a gas heater with new and improved means for controlling the radiant heat emitted therefrom.

Heaters which are adapted for widely varied consumer demands with respect to radiant heat have heretofore been largely limited. Should radiant heat be desired, in addition to convection air, it has generally been necessary to purchase a separate radiant heater. However, radiant heaters generally do not afford an effective means for controlling the relative quantity of radiant heat emitted therefrom. In other words, while the general scientific principles relating to the properties of heat radiation are well-known, there has been heretofore no effective means for utilizing the known principles of radiant heat energy control in otherwise conventional convection air furnace construction, and in an economical and reliable manner.

The control of radiation heat from a gas heater is particularly advantageous due to a generally large effective surface area where transfer of the heat of combustion takes place; and, consequently, the radiant heat emitted from the heating element spans a generally large effective area.

Accordingly, an object of this invention is to provide a new and improved means for controlling the emission of the radiant heat emitted from a gas heater or the like to the surrounding air space.

Another object of this invention is to provide a gas heater having a radiant heat control shield mounted across an exposed furnace panel, the shield having one surface capable of absorbing radiant heat while the other surface is capable of reflecting radiant heat. The shield thereby may optionally be used for reflecting the radiant heat back to the heating element to prevent its entry into the room through the furnace panel, for transferring a desired quantity of radiant heat to the surrounding air space, or when removed from the heater, for transferring a maximum amount of radiant heat to the surrounding air space.

Another object of this invention is to provide a radiant heat control shield for a gas heater or the like, the shield being of a "Venetian blind" construction wherein one side of the slats is adapted to reflect radiant heat while the other side is adapted to absorb radiant heat and transfer it to the surrounding air space. By virtue of this construction there is provided a close control of the relative quantity of radiant heat emitted from the furnace to the surrounding air space consistent with the angular positioning of the slats.

A further object of this invention is to provide a gas heater having a radiant heat control shield of the character described mounted across an exposed perforated panel thereof for optionally reflecting or absorbing radiant heat emitted from the heater together with air circulating means mounted above the heater for directing air downwardly across the front of the heater panel, to carry heated air in a generally downward path after leaving the heater.

These and still further objects and advantages of the present invention will become apparent in the specification, claims, and accompanying drawings wherein:

FIGURE 1 is a front elevation view, partially broken out, of a gas heater constructed according to the present invention;

FIGURE 2 is a view taken generally along lines 2—2 of FIGURE 1;

FIGURE 3 is an elevation section view of a fan mounted according to this invention above the heater shown in FIGURES 1 and 2;

FIGURE 4 is a plan view, partially broken out, of the structure shown in FIGURE 3;

FIGURE 5 is a partial perspective view of a heat control shield according to a modification of the present invention; and FIGURES 6, 7, 8 and 9 are diagrammatic views of the control of radiant heat according to the principles of this invention.

Reference is now made to the accompanying drawings which show, in FIGURES 1 and 2, a gas heater 10 which includes a gas burner 11, a heating element 12 carried in spaced apart relationship with respect to a front panel 14 and a rear panel 16. The front panel 14 includes an upper convection air outlet panel 18 of louvered construction and a lower air inlet panel 20, also of louvered construction for entry of combustion air and convection air. The front panel 14 also includes a perforated plate 22 spaced across the heater 10 between the panels 18 and 20. The plate 22 has inwardly extending upper and lower flanges 24 and 26, respectively, which frictionally engage the adjacent flanged ends of the panels 18 and 20, respectively. Preferably, the panels define an arc of approximately 120° to provide for enhanced dispersion of the heat leaving the heater 10.

According to an important feature of this invention, there is provided a radiant heat control shield 28 mounted to the heater 10 between the perforated plate 22 and the heating element 12. Numerous specific means for mounting the shield 28 will be apparent to those skilled in the art; and, by way of example, the shield is shown to be nested within the flanges 24 and 26 of the plate 22 by opposed upper and lower guide plates 30, and 32, respectively, which extend along the flanges 24 and 26.

The shield 28 thereby conforms generally to the curved configuration of the plate 22.

The shield 28 is preferably constructed of flexible material so as to be readily bent or otherwise flexed so that either side may face the heating element 12. Also, the shield 28 may have vertical weakened bend lines 33 (FIGURES 1 and 4) to facilitate positioning thereof adjacent the curved plate 22. One surface 34 of the plate 28 is radiant heat absorbent, e.g. painted a dull black, consistent with the well-known principles of black body radiation. Likewise, the interior surface 35 of the perforated plate 22 is also provided with a dull black surface.

The opposite surface 36 of the shield 28 is highly reflective, such as polished metal, so as to be radiant heat reflective. Thus, the shield 28 may be of very thin gauge sheet metal having the surface characterisctics as previously described. Likewise, the shield may be, practically speaking, paper thin or foil-like heat conductive material such as aluminum so that the shield may easily be shaped to conform to either surface, as desired.

According to a modified embodiment of this invention, as shown in FIGURE 5, the shield 28' is of conventional Venetian blind construction wherein a plurality of parallel, curved slats 38 have their surfaces 40 capable of radiant heat absorption while the opposite surfaces 42 are radiant heat reflective, as described.

The slats 38 are pivotally mounted at their ends for angular movement between vertical supporting bars 44 which are carried across the upper and lower flanges 24 and 26, respectively, of the perforated shield 20. In this embodiment, therefore, the angular panel 22 carries the shield 28', as is apparent. Movement of the slats 38 is afforded by deflecting bars 45 pivotally secured to the ends of the slats 38 in spaced apart relationship to the supporting bar 44. A slotted control rod 46 is pivotally secured to the bars 44 and 45 at 46 and 47, respectively to position the slats 38 between the extreme positions where the slot surfaces 42 or 44 are fully exposed to the heating element 12.

According to another feature of this invention, there is provided a circulating fan 48 mounted above the convection air outlet panel 18 adjacent to the upper end of the heater 10. The fan 48 is mounted in a housing 49 which has appropriate air inlet means 50 adjacent the upper end thereof in communication with the surrounding air space, and an air outlet panel 52 across the front. The panel 52 is of louvered construction, the louvers being inclined to deflect the air downwardly across the front panels 14 and 18 of the heater 10. The fan 48 is of any conventional construction being driven by a motor 54 and mounted to the housing 49 by bracket plates 56 and machine screws 58.

Referring now to FIGURE 6, the shield 28 (or shield 28') is diagrammatically shown with its black body surface 34 adjacent the heating element 12. The radiant heat emitted from the heating element 12 is absorbed by the surface 34 (or slat surfaces 40), passes through the perforated plate 22 and into the room.

With the shield oppositely flexed and turned, the opposite reflective surface 36 (or slat surfaces 42) is disposed adjacent the heating element 12, as shown in FIGURE 7, thereby reflecting substantially all the heat emitted therefrom back into the area of the furnace, and the radiant heat directed to the surrounding air space is reduced to substantially nothing.

In FIGURE 8 the shield 28 is arranged as shown in FIGURE 6, with the fan 47 in operation. It can be appreciated that at least a part of the convection air from panel 18 is thereby deflected downwardly, such convection air being generated by the action of the heating element 12 in a conventional manner. Conceivably the air circulation could also downwardly move the radiant heat to some degree.

In FIGURE 9, the shield 28 is removed from the heater 10 so that a maximum of radiant heat is directed to the surrounding air space by virtue of radiant heat absorbent qualities of the surface 29, and the removal of the majority of the effective area of the perforated plate 22. Likewise, with the Venetian blind shield 28' the same heat transfer effect is obtained merely by changing the surface of the slats 38 in exposure to the heating element 14. By virtue of the provision of the Venetian blind slat construction, the quantity of radiant heat emitted to the surrounding air space may be regulated within relatively close limits simply by movement of the control rod 46, as described.

While the front panel 14 is described as encompassing an arc of 120°, the front panel 14 may have suitable alternative configurations as will be apparent to those skilled in the art.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. In an upright wall-type gas heater, a vertically extending front panel having a perforated section of substantial area, a heating element carried within said gas heater, an upright continuous radiant heat control shield mounted across the front of said heater in generally vertical relationship between said perforated section of said front panel and said heating element, one surface of said shield being radiant heat absorbent while the opposite surface thereof is radiant heat reflective, air-admitting means carried at the front of said heater in spaced relationship below said shield and providing openings between the interior of said heater and the surrounding air space, and air-exhausting means carried at the front of said heater in spaced relationship above said shield and providing openings between the interior of said heater and the surrounding air space.

2. The combination defined in claim 1 wherein said perforated front panel is of curved configuration, the concave position thereof facing said heating element, and said shield is constructed of flexible material operative for manual bending whereby either surface thereof may be exposed to said heating element while conforming to the concave configuration of said front panel.

3. Combination defined in claim 1 wherein said shield includes a plurality of Venetian blind and slat means spaced one adjacent the other, and means for angularly moving said slat means in unison to present the desired surfaces thereof adjacent said heating element.

4. The combination defined in claim 1 including circulating fan means for moving air from the surrounding space downwardly across the front panel of said heater.

5. The combination defined in claim 1 wherein said shield has spaced apart vertical, weakened bend lines to provide a reversible curvilinear shape to said shield.

6. In combination, a gas heater, a heating element operatively mounted in said gas heater, said heater having a front panel having apertures providing removal of a majority of the effective surface area thereof, convection and combustion air inlet means at the bottom of said front panel, convection air outlet means at the top of said front panel, an upright continuous radiant heat control shield mounted across said panel between said air inlet means and air outlet means, one surface of said shield having a dull black surface, the opposite surface thereof having a brightly reflective surface, the surface of said front panel which faces said shield being a dull black, and circulating fan means mounted above said heater for directing air downwardly across said front panel.

7. The combination defined in claim 6 wherein said shield is of a bendable sheet metal construction whereby the configuration thereof may be conformed to the configuration of said panel.

References Cited in the file of this patent

UNITED STATES PATENTS

| 2,302,235 | Martin | Nov. 17, 1942 |
| 2,700,970 | Cartter et al. | Feb. 1, 1955 |

FOREIGN PATENTS

| 571,797 | Great Britain | Sept. 10, 1945 |
| 574,676 | Great Britain | Jan. 18, 1946 |

OTHER REFERENCES

Heating Air Conditioning, Ventilation and Insulation Publication, Volume 22, Number 180, December 1960, pages 433–436 relied on.